United States Patent
Kakutani et al.

(10) Patent No.: US 9,296,414 B2
(45) Date of Patent: Mar. 29, 2016

(54) ELECTRIC POWER STEERING APPARATUS

(71) Applicant: JTEKT CORPORATION, Osaka-shi, Osaka (JP)

(72) Inventors: Satoshi Kakutani, Kashihara (JP); Takeshi Kawara, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/695,473

(22) Filed: Apr. 24, 2015

(65) Prior Publication Data

US 2015/0329139 A1  Nov. 19, 2015

(30) Foreign Application Priority Data

May 14, 2014 (JP) .................... 2014-100449

(51) Int. Cl.
  *B62D 5/04* (2006.01)
  *B62D 3/04* (2006.01)
  *F16D 3/68* (2006.01)

(52) U.S. Cl.
  CPC ............... *B62D 5/0409* (2013.01); *B62D 3/04* (2013.01); *F16D 3/68* (2013.01)

(58) Field of Classification Search
  CPC .................... B62D 5/0409; B62D 3/04
  See application file for complete search history.

(56) References Cited

U.S. PATENT DOCUMENTS

| | | | |
|---|---|---|---|
| 2,706,897 A | 4/1955 | Holoye | |
| 6,491,131 B1 * | 12/2002 | Appleyard | B62D 5/0409 180/444 |
| 2012/0264524 A1 * | 10/2012 | Nakagawa | B62D 5/0409 464/73 |
| 2014/0029884 A1 * | 1/2014 | Toyama | B62D 5/0409 384/490 |
| 2015/0217804 A1 | 8/2015 | Moriyama et al. | |
| 2015/0345609 A1 * | 12/2015 | Kiyota | F16H 55/22 180/444 |

FOREIGN PATENT DOCUMENTS

| | | |
|---|---|---|
| EP | 1 752 671 A1 | 2/2007 |
| EP | 1 830 090 A1 | 9/2007 |
| EP | 2 518 358 A1 | 10/2012 |
| JP | 2002-518242 A | 6/2002 |
| JP | 2004-149070 A | 5/2004 |
| JP | 4491716 B2 | 6/2010 |
| JP | 2013-173440 A | 9/2013 |
| WO | 2014/069060 A1 | 5/2014 |

OTHER PUBLICATIONS

Sep. 28, 2015 Extended Search Report issued in European Patent Application No. 15165493.6.

* cited by examiner

*Primary Examiner* — Kevin Hurley
*Assistant Examiner* — Gabriela C Craciun
(74) *Attorney, Agent, or Firm* — Oliff PLC

(57) ABSTRACT

In an electric power steering apparatus, an intermediate member of a shaft coupling connecting an assisting electric motor and a speed reduction mechanism together includes a cylindrical intermediate boss portion, a plurality of arm portions extending radially from the intermediate boss portion, and engagement spaces each defined by a pair of the adjacent arm portions. Furthermore, the intermediate member includes a center portion, a first cover portion, and a second cover portion. The center portion slightly protrudes toward the engagement space side with respect to the first cover portion and the second cover portion.

6 Claims, 13 Drawing Sheets

ELECTRIC POWER STEERING APPARATUS

INCORPORATION BY REFERENCE

The disclosure of Japanese Patent Application No. 2014-100449 filed on May 14, 2014 including the specification, drawings and abstract is incorporated herein by reference in its entirety.

BACKGROUND OF THE INVENTION

1. Field of the Invention

The invention relates to an electric power steering apparatus.

2. Description of Related Art

Some conventional vehicle electric power steering apparatuses apply an assist force at the time of a steering operation by reducing the rotation speed of an electric motor by use of a speed reduction mechanism and then transmitting the resultant rotation to a steering system, for example, as disclosed in Japanese Patent No. 4491716 (JP 4491716).

The speed reduction mechanism includes a worm, a worm wheel, and a driving shaft to which the worm is attached. The driving shaft is rotatably supported by a housing via a pair of rolling bearings provided at respective opposite ends of the driving shaft. A shaft coupling is disposed between an output shaft of the electric motor and the driving shaft to transmit rotation.

The shaft coupling includes a first yoke attached to the output shaft, a second yoke attached to the driving shaft, and an intermediate member disposed between the first yoke and the second yoke. The first yoke has a cylindrical first boss portion, and a plurality of pawl portions protruding toward the intermediate member with respect to the first boss portion and having a trapezoidal shape. The second yoke has a cylindrical second boss portion, and a plurality of pawl portions protruding toward the intermediate member with respect to the second boss portion and having a trapezoidal shape. The intermediate member has a cylindrical intermediate boss portion, a plurality of arm portions extending radially from the intermediate boss portion, and trapezoidal engagement spaces each defined by a pair of the adjacent arm portions.

The intermediate member engages with the first yoke such that the first boss portions are placed in every other engagement space among the engagement spaces provided in a circumferential direction, and the intermediate member engages with the second yoke such that the second boss portions are placed in the remaining engagement spaces. Thus, the rotation of the output shaft is transmitted to the driving shaft via the first yoke, the intermediate member, and the second yoke.

In the shaft coupling configured as described above, a stick-slip sound may be generated in the shaft coupling portion while the output shaft, the shaft coupling, and the driving shaft are in rotation.

SUMMARY OF THE INVENTION

An object of the present invention is to provide an electric power steering apparatus that prevents a stick-slip sound generated in a shaft coupling portion.

According to an aspect of the present invention, an electric power steering apparatus includes:

an electric motor that generates a rotation assist force in accordance with a steering operation of a driver;

a shaft coupling that has a first end coupled to an output shaft of the electric motor; and a speed reduction mechanism coupled to a second end of the shaft coupling to reduce a rotation speed of the output shaft of the electric motor to transmit a reduced rotation speed to a steering mechanism.

The shaft coupling includes a first yoke having the first end;

a second yoke having the second end; and an intermediate member provided between the first yoke and the second yoke.

The intermediate member includes a cylindrical intermediate boss portion, a plurality of arm portions extending radially from the intermediate boss portion, and an engagement space defined by a pair of the adjacent arm portions.

The intermediate member includes a center portion, a first cover portion disposed on an electric motor side with respect to the center portion, and a second cover portion disposed on a speed reduction mechanism side with respect to the center portion.

The center portion includes a center boss portion that configures a part of the intermediate boss portion, a center arm portion that configures a part of the arm portion, and a center engagement space that configures a part of the engagement space.

The first cover portion includes a first cover boss portion that configures a part of the intermediate boss portion, a first cover arm portion that configures a part of the arm portion, and a first cover engagement space that configures a part of the engagement space.

The second cover portion includes a second cover boss portion that configures a part of the intermediate boss portion, a second cover arm portion that configures a part of the arm portion, and a second cover engagement space that configures a part of the engagement space.

The center portion is configured to protrude toward an engagement space side with respect to the first cover portion and the second cover portion.

Torque generated by the electric motor is transmitted to the speed reduction mechanism via the first yoke, the intermediate member, and the second yoke. A part of the first yoke and a part of the second yoke engages with the intermediate member in the engagement spaces to transmit the torque. Since the center portion of the intermediate member is configured to protrude toward the engagement space side with respect to the first cover portion and the second cover portion, first, the center portion engages with the first yoke and the second yoke and receives a force, and is then elastically deformed. Thereafter, the first cover portion and the second cover portion engage with the first yoke and the second yoke. In this engaged state, an elastic force acts between the intermediate member and each of the first and second yokes. Thus, a stick-slip phenomenon is unlikely to occur. This suppresses generation of a stick-slip sound.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below based on FIGS. 1 to 13.

Figure 1:
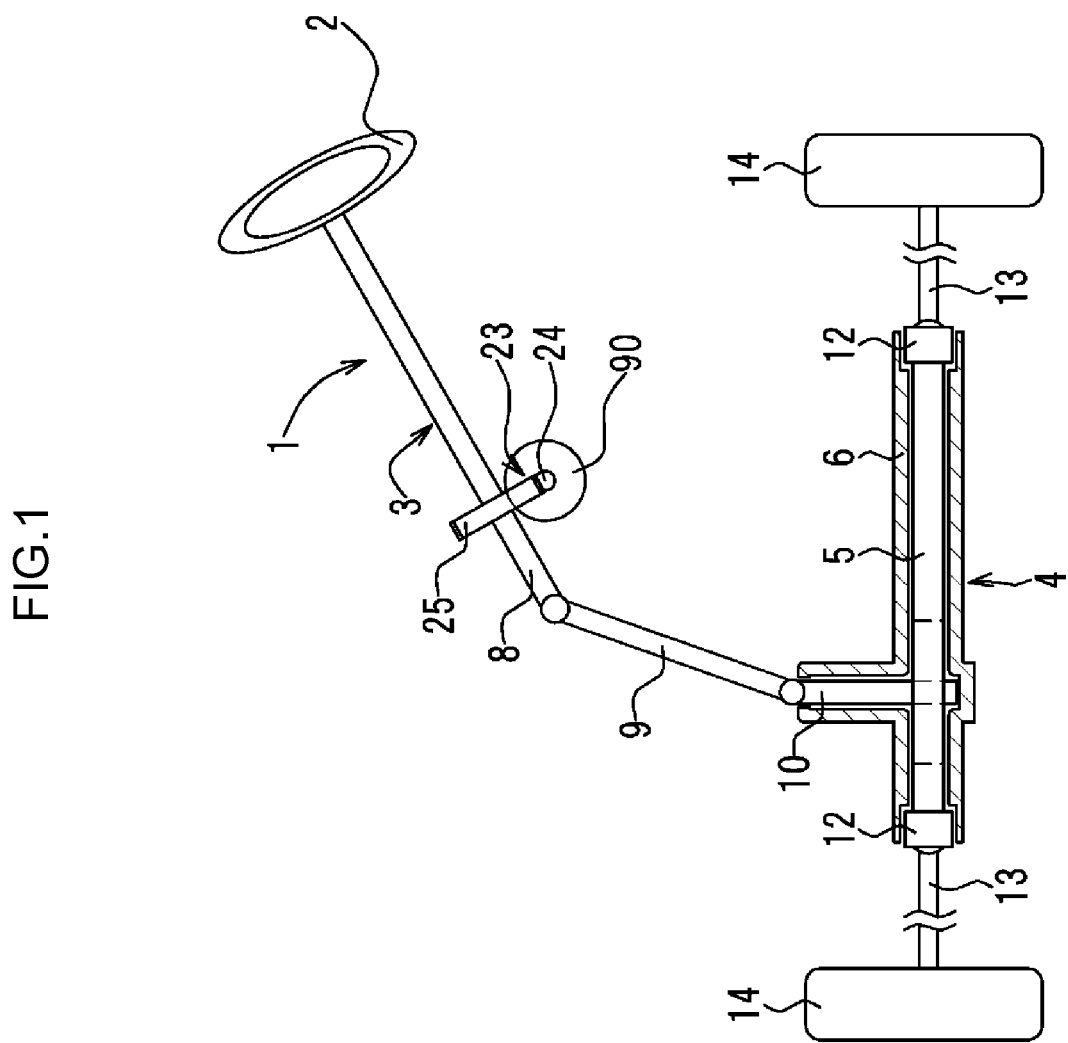
FIG. 1 is a schematic configuration diagram of an electric power steering apparatus according to an embodiment of the present invention.

As depicted in FIG. 1, an electric power steering apparatus 1 includes a column mechanism 3 rotationally operated by a steering wheel 2 and receiving power assistance from an electric motor 90, an intermediate shaft 9 that transmits rotation of the column mechanism 3, and a rack and pinion mechanism 4 that converts rotation of the intermediate shaft 9 into axial movement of tie rods 13.

The column mechanism 3 includes a steering shaft 8 to which the steering wheel 2 is rotatably coupled, the electric motor 90 that performs power assistance in accordance with an operation of the steering wheel 2, and a speed reduction mechanism 23 that reduces the speed of rotation of the electric motor 90. The speed reduction mechanism 23 includes a worm 24 and a worm wheel 25.

The rack and pinion mechanism 4 includes a pinion shaft 10 rotatably coupled to the intermediate shaft 9, a rack shaft 5 that meshes with the pinion shaft 10, rack ends 12 coupled to the rack shaft 5 at the respective opposite ends thereof, and a rack housing 6 that supports the pinion shaft 10 such that the pinion shaft 10 is rotatable and that supports the rack shaft 5 such that the rack shaft 5 is movable in an axial direction.

The rack and pinion mechanism 4 has a function to convert rotation of the steering shaft 8 into reciprocating linear motion of the rack shaft 5. The tie rods 13 are pivotally coupled to respective opposite ends of the rack shaft 5 via respective rack ends 12. A distal end of each of the tie rods 13 is coupled to a knuckle not depicted in the drawings and to which steered wheels 14 are assembled. The reciprocating linear motion of the rack shaft 5 is transmitted to the knuckles via the tie rods 13 to change the steering angle of the steered wheels 14, which changes the traveling direction of the vehicle.

Figure 2:
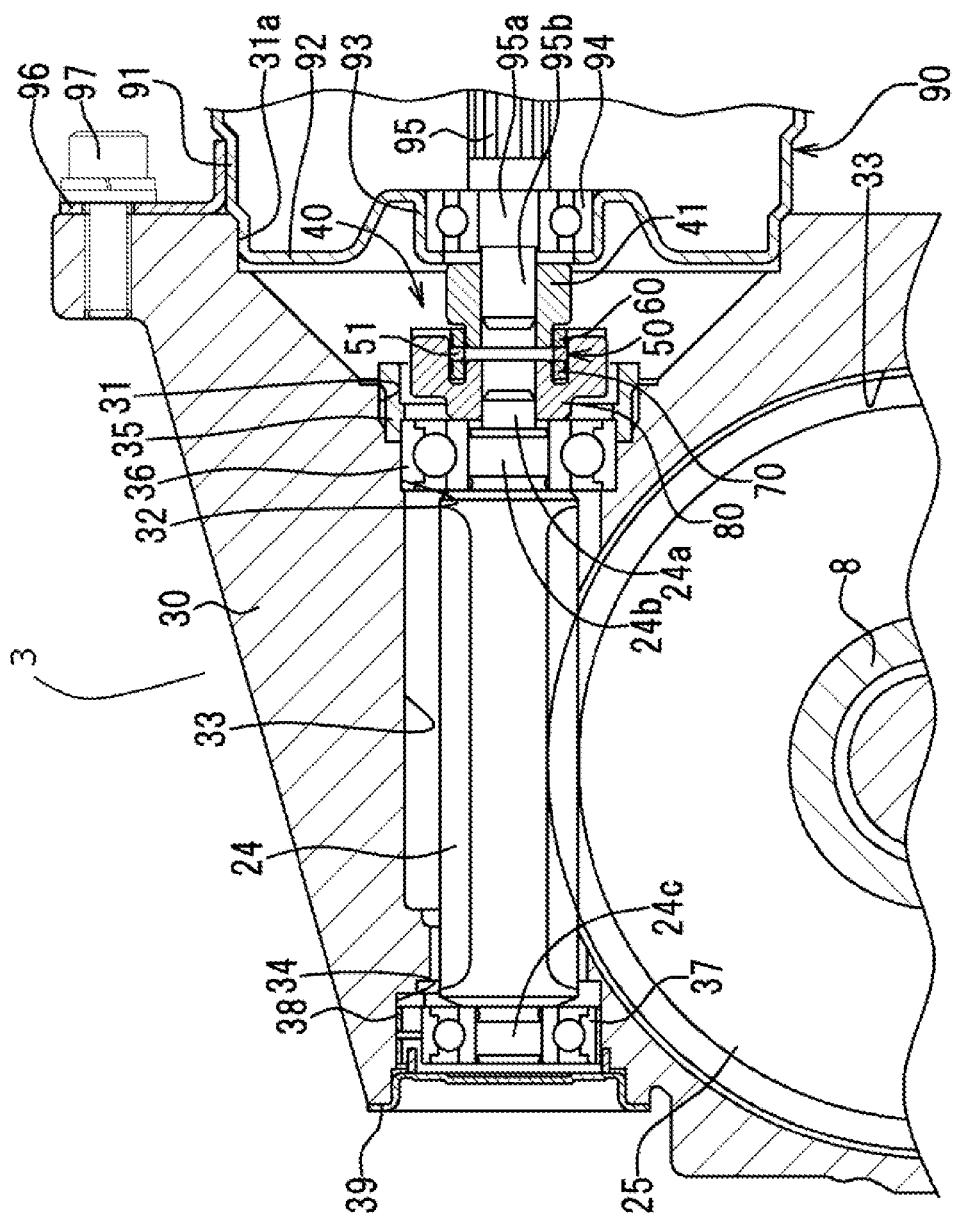
FIG. 2 is a cross-sectional view of the vicinity of a shaft coupling in the electric power steering apparatus according to the embodiment of the present invention.

As depicted in FIG. 2, the column mechanism 3 includes a housing 30 in which the speed reduction mechanism 23 is housed. The housing 30 is provided with a motor fixing hole 31a having a large diameter, a threaded hole 31 having a smaller diameter than the motor fixing hole 31a, a bearing mounting hole 32 having a smaller diameter than the threaded hole 31, a worm housing portion 33 having a smaller diameter than the bearing mounting hole 32, and a bearing support hole 34 having a larger diameter than the worm housing portion 33. The motor fixing hole 31a, the threaded hole 31, the bearing mounting hole 32, the worm housing portion 33, and the bearing support hole 34 are formed in this order from right to left in FIG. 2.

A part of a casing 91 for the electric motor 90 is fitted in the motor fixing hole 31a. A bracket 96 is integrated with the casing 91 by welding and fixed to the housing 30 by a fixing bolt 97. That is, the electric motor 90 is fixed to the housing 30 via the fixing bolt 97.

A first bearing 36 is fitted in the bearing mounting hole 32, and a fixing nut 35 is threaded in the threaded hole 31. The first bearing 36 is sandwiched between a step portion of the housing 30 and the fixing nut 35 so as to extend in the axial direction. The first bearing 36 is fitted in the bearing mounting hole 32 and thus fixed to the housing 30.

The worm 24 is rotatably housed in the worm housing portion 33. A first fitting portion 24a having a small diameter and a second fitting portion 24b having a larger diameter than the first fitting portion 24a are formed in order at one end of the worm 24. A third fitting portion 24c is formed at the other end of the worm 24. The second fitting portion 24b is fitted to the first bearing 36, and the third fitting portion 24c is fixedly fitted to a second bearing 37. A curved plate spring 38 is disposed between the second bearing 37 and the bearing support hole 34. The curved plate spring 38 is annular and is partly provided with a swell projecting radially outward. The swell causes the worm 24 to be biased in such a direction that the worm 24 meshes with the worm wheel 25 while being tilted using the first bearing 36 as a fulcrum. The bearing support hole 34 is closed by an end cover 39.

A bottom portion 92 of the casing 91 for a motor 90 is shaped like a disk and has a cylindrical portion 93 in the radial center of the bottom portion 92. A motor bearing 94 is fitted to the cylindrical portion 93, and an output shaft 95 is fitted and supported in the motor bearing 94. A fourth fitting portion 95b having a small diameter and a fifth fitting portion 95a having a larger diameter than the fourth fitting portion 95b are formed in order at one end of the output shaft 95. The fifth fitting portion 95a is fitted to the motor bearing 94.

A shaft coupling 40 is provided between the output shaft 95 and the worm 24. The shaft coupling 40 includes a first yoke 41 fixedly fitted to the fourth fitting portion 95b, a second yoke 80 fixedly fitted to the first fitting portion 24a, and an intermediate member 50 provided between the first yoke 41 and the second yoke 80 in a rotating direction. The shaft coupling 40 has a function to transmit rotation of the output shaft 95 to the worm 24 while absorbing the deflection angle between the output shaft 95 and the worm 24.

As depicted in FIGS. 3 to 6, the first yoke 41 has a cylindrical first boss portion 43, a first disk portion 44 extending radially outward with respect to the first boss portion 43, and a plurality of first pawl portions 42 protruding toward the intermediate member 50 from the first disk portion 44 and disposed at regular intervals in a circumferential direction. Each first pawl portion 42 has a trapezoidal shape as viewed in the axial direction. A radially outer side and a radially inner side of the trapezoidal shape have a circular-arc shape. Circumferentially opposite sides of the trapezoidal shape each have a linear shape. Each first pawl portion 42 has a rectangular shape as viewed in a radial direction. Each side of the rectangular shape has a linear shape. The sides of first pawl portion 42 are each chamfered into a circular arc shape in cross section. Accordingly, the intersection point between two sides has a part of a spherical shape. The first yoke 41 is formed of a metal material.

The second yoke 80 has a cylindrical second boss portion 82, a second disk portion 83 extending radially outward with respect to the second boss portion 82, and a plurality of second pawl portions 81 protruding toward the intermediate member 50 from the second disk portion 83 and disposed at regular intervals in a circumferential direction. Each second pawl portion 81 has a trapezoidal shape as viewed in the axial direction. A radially outer side and a radially inner side of the trapezoidal shape have a circular-arc shape. Circumferentially opposite sides of the trapezoidal shape each have a linear shape. Each second pawl portion 81 has a rectangular shape as viewed in the radial direction. Each side of the rectangular shape has a linear shape. The sides of second pawl portion 81 are each chamfered into a circular arc shape in cross section. Accordingly, the intersection point between two sides has a part of a spherical shape. The second yoke 80 is formed of a metal material.

Figure 11:
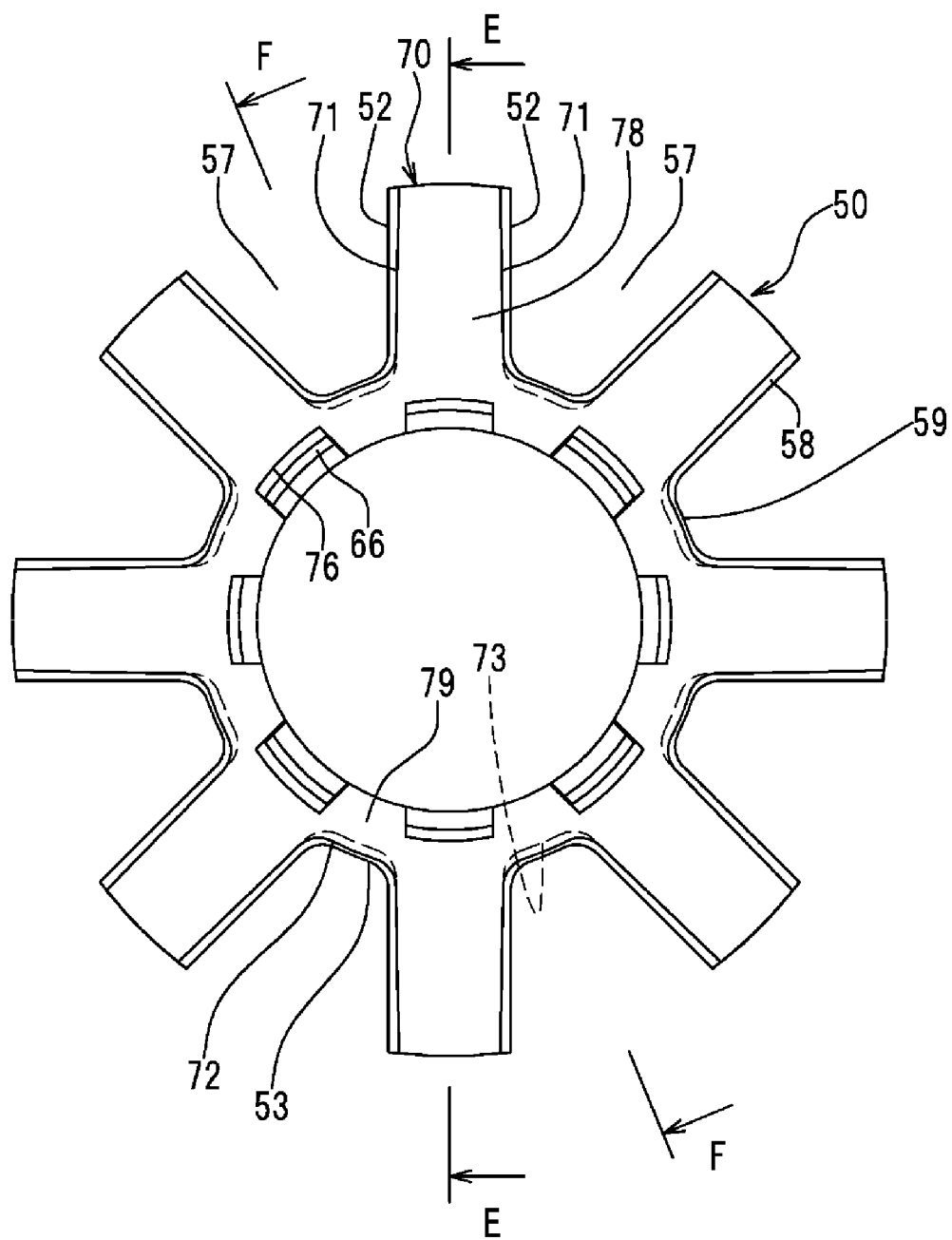
FIG. 11 is a front view of an intermediate member according to the embodiment of the present invention.
Figure 12:
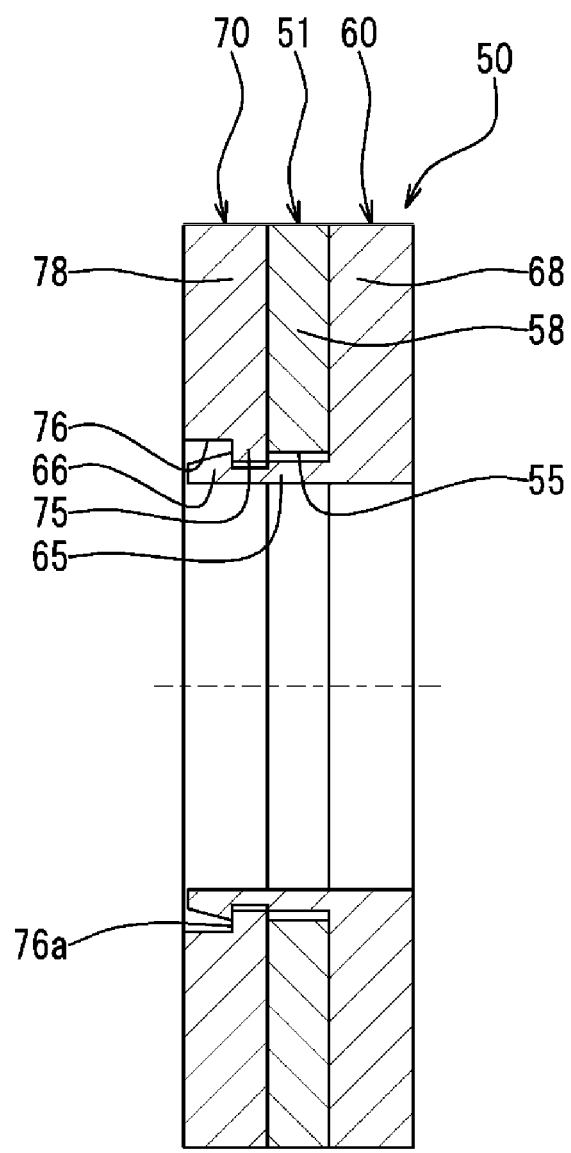
FIG. 12 is a cross-sectional view of the intermediate member according to the embodiment of the present invention, taken along line E-E in FIG. 11.
Figure 13:
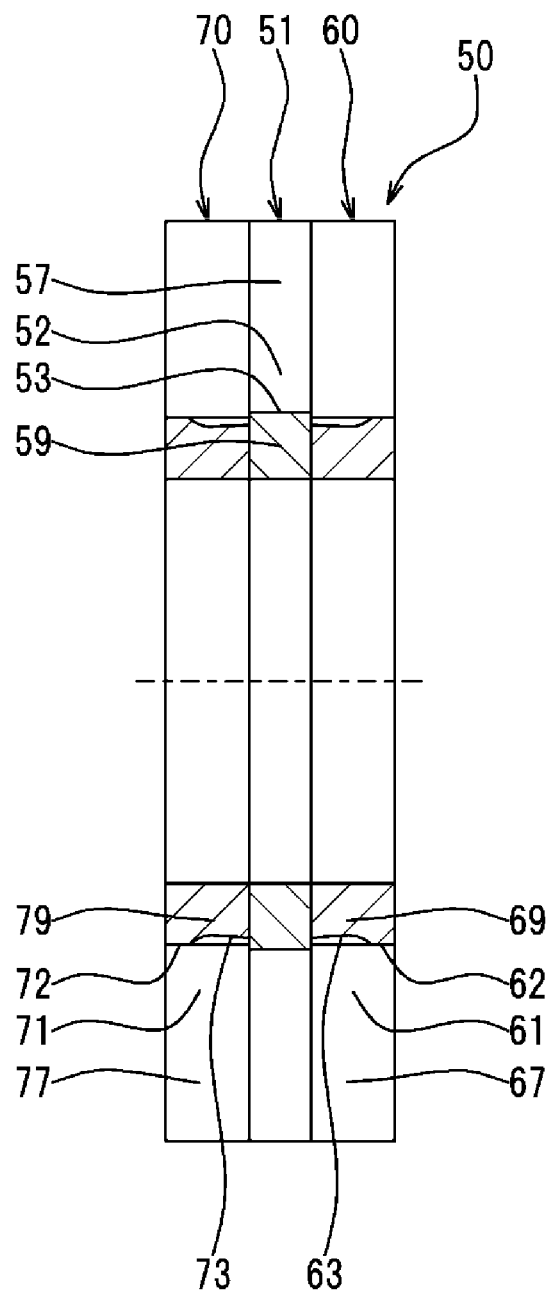
FIG. 13 is a cross-sectional view of the intermediate member according to the embodiment of the present invention, taken along line F-F in FIG. 11.

As depicted in FIGS. 11 to 13, the intermediate member 50 has a cylindrical intermediate boss portion, a plurality of arm portions extending radially from the intermediate boss portion, and a plurality of engagement spaces provided at regular intervals in the circumferential direction. The intermediate member 50 engages with the first yoke 41 such that the first pawl portions 42 are placed in every other engagement space (see FIG. 4) among the engagement spaces provided in the circumferential direction and, the intermediate member 50 engages with the second yoke 80 such that the second pawl portions 81 are placed in the remaining engagement spaces (see FIG. 6). Thus, rotation of the output shaft 95 is transmitted to the worm 24 via the first yoke 41, the intermediate member 50, and the second yoke 80. Each of the engagement spaces is defined by a pair of the adjacent arm portions, and has a trapezoidal shape as viewed in the axial direction. A radially inner side of the trapezoidal shape has a circular-arc shape, and circumferentially opposite ends of the trapezoidal shape each have a linear shape. Two radially inward corners of the trapezoidal shape each have a circular arc. In other words, chamfers each shaped like a circular arc in cross section are formed between the intermediate boss portion and the arm portions.

As depicted in FIG. 2 and FIG. 12, the intermediate member 50 includes a center portion 51 formed of a soft resin, a first cover portion 60 disposed on the output shaft 95 side of the center portion 51 and formed of a hard resin, and a second cover portion 70 disposed on the worm 24 side of the center portion 51 and formed of a hard resin.

The center portion 51 includes a center boss portion 59 that configures a part of the intermediate boss portion, center arm portions 58 that configure a part of the arm portions, and center engagement spaces 57 that configure a part of the engagement spaces. Chamfers each shaped like a circular arc in cross section are formed between the center boss portion 59 and each center arm portion 58. Center engagement grooves 55 are formed in an inner periphery of the center boss portion 59 so as to penetrate the center portion 51 in the axial direction, and are provided at regular intervals in the circumferential direction.

The first cover portion 60 includes a first cover boss portion 69 that configures a part of the intermediate boss portion, first cover arm portions 68 that configure a part of the arm portions, and first cover engagement spaces 67 that configure a part of the engagement spaces. Chamfers each shaped like a circular arc in cross section are formed between the first cover boss portion 69 and each first cover arm portion 68. Tongue pieces 65 protrude from a warm side end of the first cover portion 60 toward the second cover portion 70 in the axial direction. A hook 66 protruding radially outward is formed at a tip of each tongue piece 65.

The second cover portion 70 includes a second cover boss portion 79 that configures a part of the intermediate boss portion, second cover arm portions 78 that configure a part of the arm portions, and second cover engagement spaces 77 that configure a part of the engagement spaces. Chamfers each shaped like a circular arc in cross section are formed between the second cover boss portion 79 and each second cover arm portion 78. Second cover engagement grooves 76 are formed in an inner periphery of the second cover boss portion 79 so as to penetrate the second cover portion 70 in the axial direction, and are provided at regular intervals in the circumferential direction. A protruding portion 75 protruding radially inward is formed on the center portion 51 side of each second cover engagement groove 76.

Each tongue piece 65 is inserted through the center engagement groove 55 and the second cover engagement groove 76, and each hook 66 engages with a step surface 76a of the protruding portion 75 in the axial direction. Thus, the tongue pieces 65 engage with the center engagement grooves 55 and the second cover engagement grooves 76 in the circumferential direction, and the first cover portion 60, the center portion 51, and the second cover portion 70 are disposed on top of one another in the axial direction. In this state, the hooks 66 engage with the step surfaces 76a of the protruding portions 75 in the axial direction to integrate the first cover portion 60, the center portion 51, and the second cover portion 70 together, and thus the intermediate member 50 is configured.

Each circumferential side surface 52 of the center arm portion 58 slightly protrudes toward the engagement space with respect to a circumferential side surface 61 of the first cover arm portion 68 and a circumferential side surface 71 of the second cover arm portion 78. An outer periphery 53 of the center boss portion 59 slightly protrudes toward the engagement space side, that is, protrudes radially outward, with respect to an outer periphery 62 of the first cover boss portion 69 and an outer periphery 72 of the second cover boss portion 79.

In the outer periphery of the first cover boss portion 69, first thinned portions 63 are formed which are each recessed radially inward at a position corresponding to an inner periphery of a distal of the second pawl portion 81. In the outer periphery of the second cover boss portion 79, second thinned portions 73 are formed which are each recessed radially inward at a position corresponding to an inner periphery of a distal of the first pawl portion 42. For the tilt of the second yoke 80, in one case, the second yoke 80 tilts around the first bearing 36 along with the worm 24. In another case, the tilted second yoke 80 is fixedly fitted in the first fitting portion 24a and tilts around the second boss portion 82. In the embodiment, the second thinned portions 73 are formed in view of the latter case. The first thinned portions 63 are formed in view of a case where the tilted first yoke 41 is fixedly fitted to the fourth fitting portion 95b and tilts around the first boss portion 43.

Next, operation of the electric power steering apparatus 1 will be described.

As depicted in FIG. 1, a rotating operation of the steering wheel 2 is transmitted to the pinion shaft 10 via the steering shaft 8 and the intermediate shaft 9. Rotating motion of the pinion shaft 10 is converted into reciprocating linear motion of the rack shaft 5 by the rack and pinion mechanism 4. The reciprocating linear motion is further transmitted to the knuckles via the tie rods 13 to change the steering angle of the steered wheels 14.

Torque generated at the time of a rotating operation of the steering wheel 2 is detected by a sensor not depicted in the drawings. A voltage according to the torque and a vehicle speed is applied to the electric motor 90, which then generates an assist force transmitted to the steering shaft 8 via the speed reduction mechanism 23. A reduced force is needed to operate the steering wheel 2, enabling light operation.

As depicted in FIG. 2, rotation of the output shaft 95 of the electric motor 90 is transmitted to the worm 24 via the first yoke 41, the intermediate member 50, and the second yoke 80 and further to the steering shaft 8 via the worm wheel 25.

Figure 3:
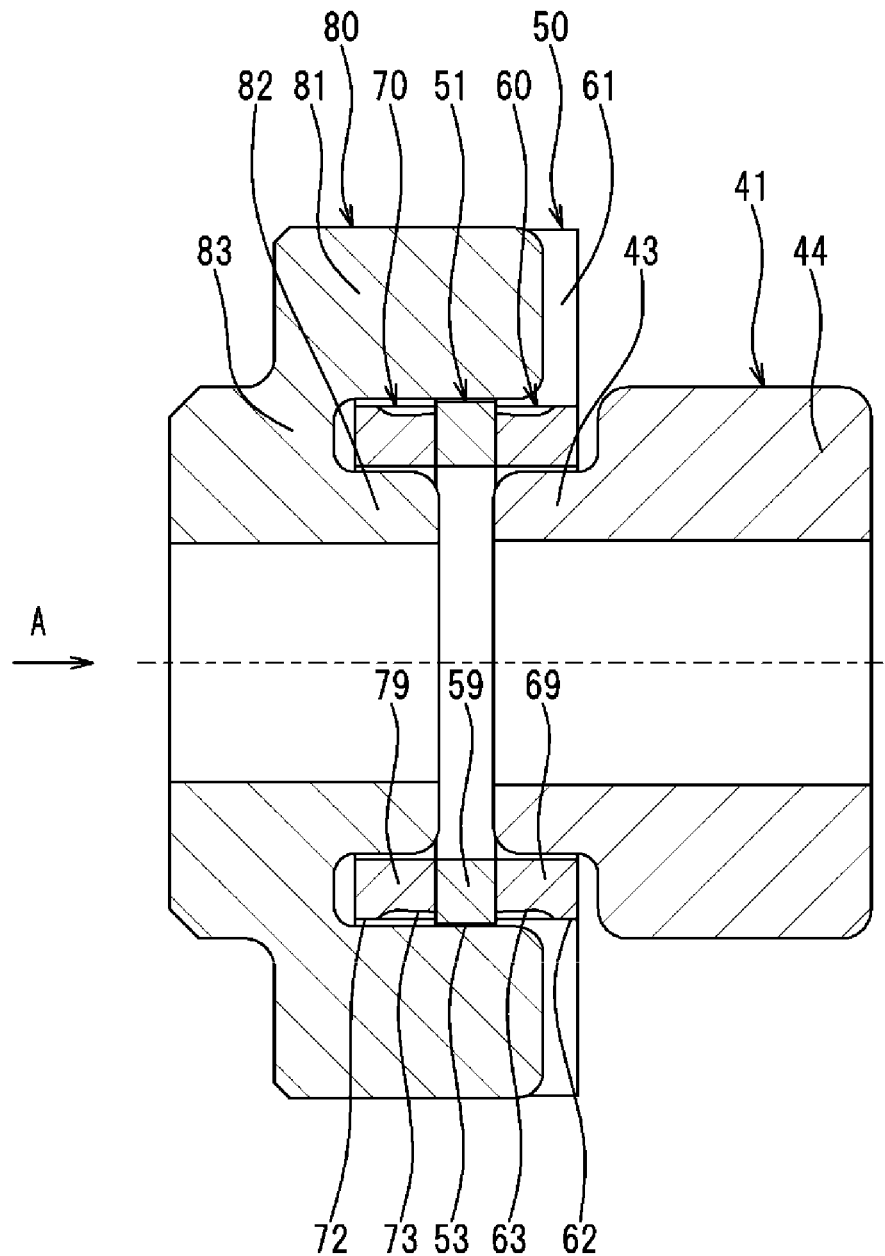
FIG. 3 is an enlarged cross-sectional view of the shaft coupling according to the embodiment of the present invention.
Figure 4:
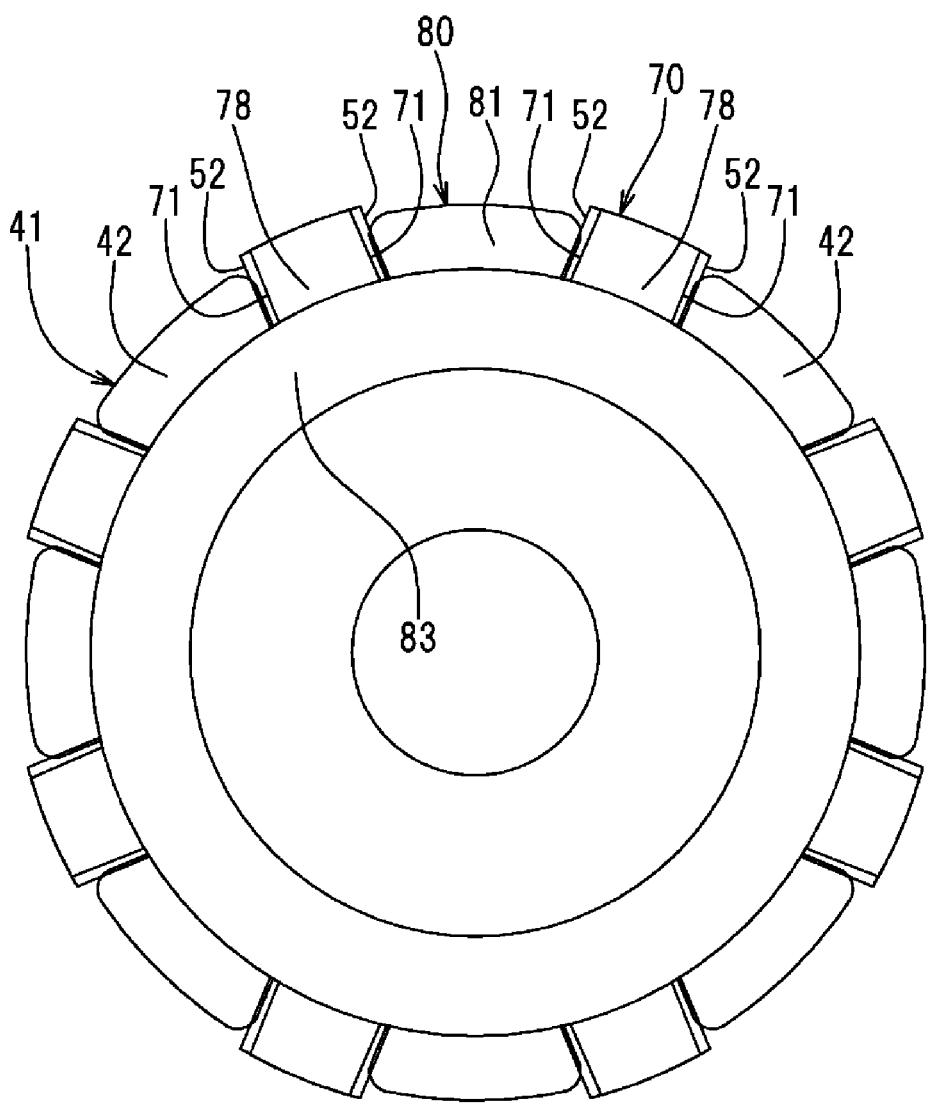
FIG. 4 is a cross-sectional view of the shaft coupling according to the embodiment of the present invention, taken along arrow A in FIG. 3.
Figure 5:
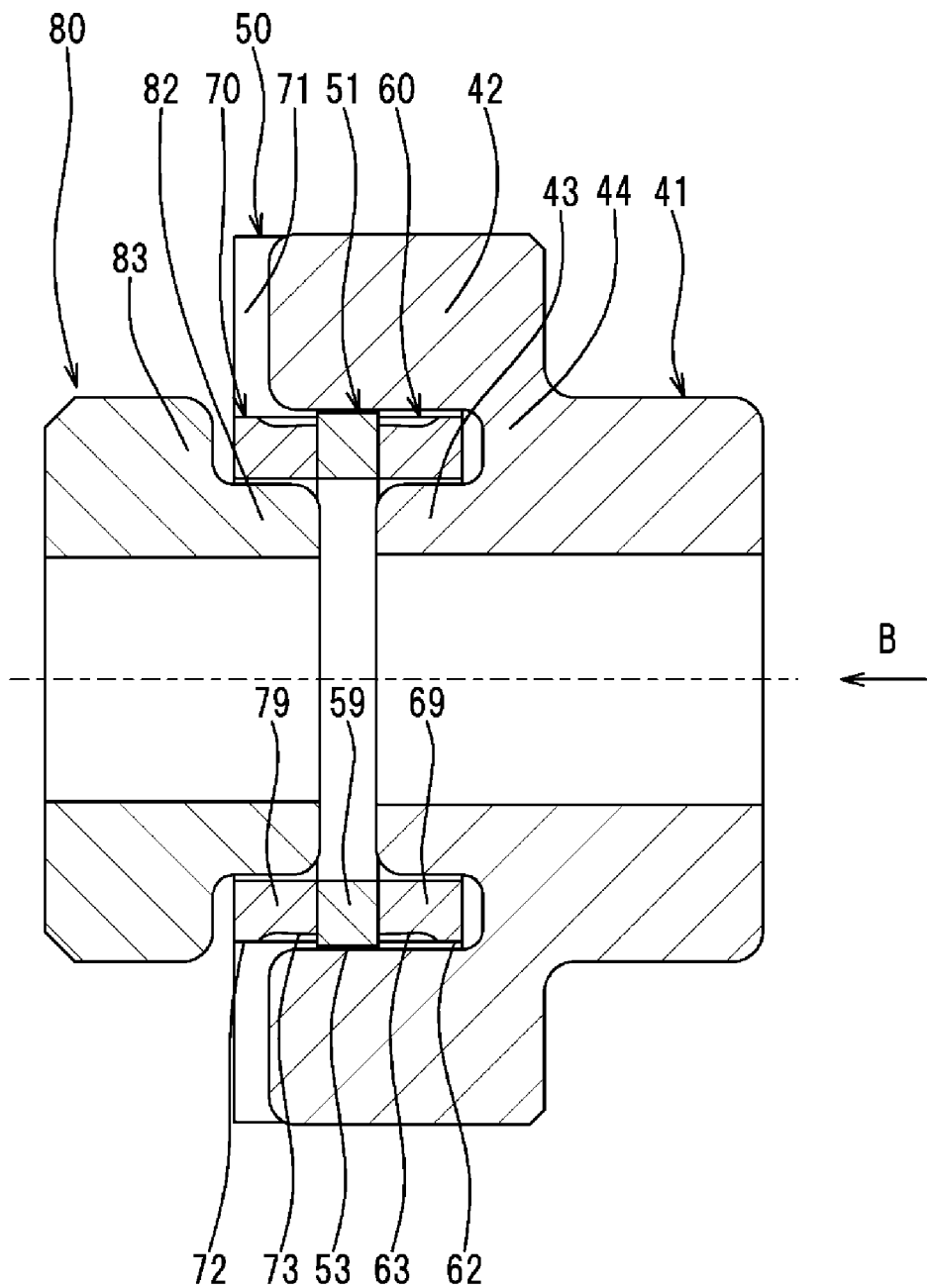
FIG. 5 is an enlarged cross-sectional view of the shaft coupling according to the embodiment of the present invention, in a different in phase from FIG. 3.
Figure 6:
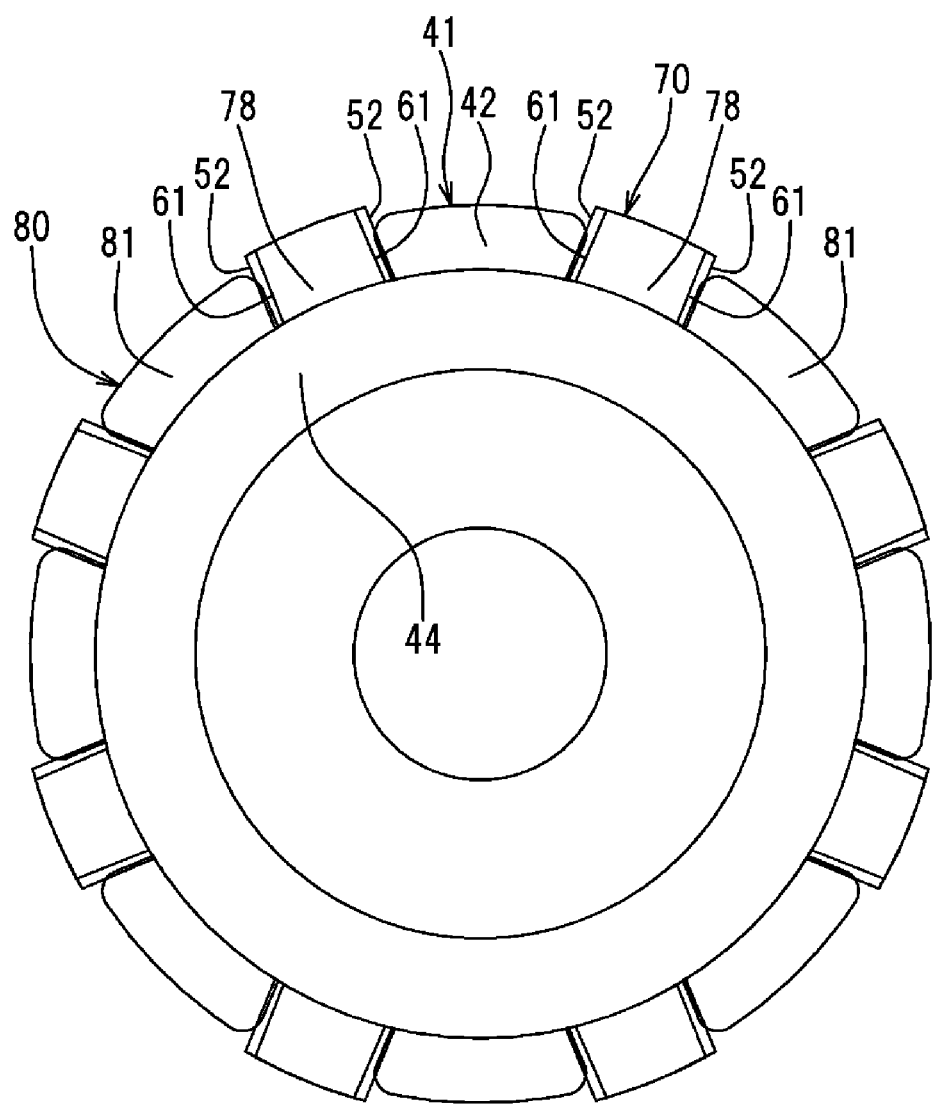
FIG. 6 is a cross-sectional view of the shaft coupling according to the embodiment of the present invention, taken along arrow B in FIG. 5.

FIG. 3 is a state diagram illustrating that the first yoke 41, the intermediate member 50, and the second yoke 80 are coaxially disposed. With no power assistance from the electric motor 90, all the center arm portions 58 are elastically deformed in the circumferential direction by the first pawl portions 42 and the second pawl portions 81 because the first pawl portions 42 and the second pawl portions 81 are slightly larger than the respective engagement spaces defined by the center arm portions 58 as depicted in FIG. 4. However, as depicted in FIG. 3 and FIG. 5, the first pawl portions 42 and the second pawl portions 81 do not interfere with the center boss portion 59. The first pawl portions 42 and the second pawl portions 81 are slightly smaller than the respective engagement spaces defined by the first cover arm portions 68 and the second cover arm portions 78 and thus do not interfere with the first cover arm portions 68 and the second cover arm portions 78. Furthermore, the first pawl portions 42 and the second pawl portions 81 do not interfere with the first cover boss portion 69 and the second cover boss portion 79.

When a weak power assist force is exerted, the center arm portions 58 disposed in the circumferential direction are each sandwiched between a corresponding one of the first pawl portions 42 and a corresponding one of the second pawl portions 81 and compressed from both sides in the circumferential direction. Rotating motion is transmitted to the second pawl portions 81 via the first pawl portions 42 and the center arm portions 58. At this time, the weak power assist force causes the center arm portions 58 to be compressed only by a small amount. The first pawl portions 42 and the second pawl portions 81 are not in contact with the first cover arm portions 68 and second cover arm portions 78.

When a strong power assist force is exerted, the center arm portions 58 disposed in the circumferential direction are each sandwiched between a corresponding one of the first pawl portions 42 and a corresponding one of the second pawl portions 81 and further compressed from both sides in the circumferential direction. The strong power assist force causes the center arm portions 58 to be compressed by a large amount. The first pawl portions 42 and the second pawl portions 81 also come into contact with the first cover arm portions 68 and second cover arm portions 78. This allows the rotating motion of the first pawl portions 42 to be transmitted to the second pawl portions 81 via the center arm portions 58, the first cover arm portions 68, and the second cover arm portions 78. In this case, the contacts between both the first cover arm portions 68 and the second cover arm portions 78 and both the first pawl portions 42 and the second pawl portions 81 are contacts resulting from pressing of the cover arm portions and the pawl portions against one another in the circumferential direction. In particular, the contact portions between the center arm portions 58 and both the first pawl portions 42 and the second pawl portions 81 are compressed by a large amount, and a strong elastic force is exerted on the contact portions. Thus, a stick-slip phenomenon is unlikely to occur, and a stick-slip sound is unlikely to be generated.

FIGS. 7 to 10 are state diagrams illustrating that the first yoke 41 is disposed so as to tilt with respect to the intermediate member 50 and the second yoke 80 is disposed so as to tilt with respect to the intermediate member 50. That is, the tilted second yoke 80 is fixedly fitted to the first fitting portion 24a in FIG. 2, and the tilted first yoke 41 is fixedly fitted to the fourth fitting portion 95b. Rotation of the fourth fitting portion 95b causes the first yoke 41 to deflect around the fourth fitting portion 95b. Rotation of the first fitting portion 24a causes the second yoke 80 to deflect around the first fitting portion 24a.

Figure 9:
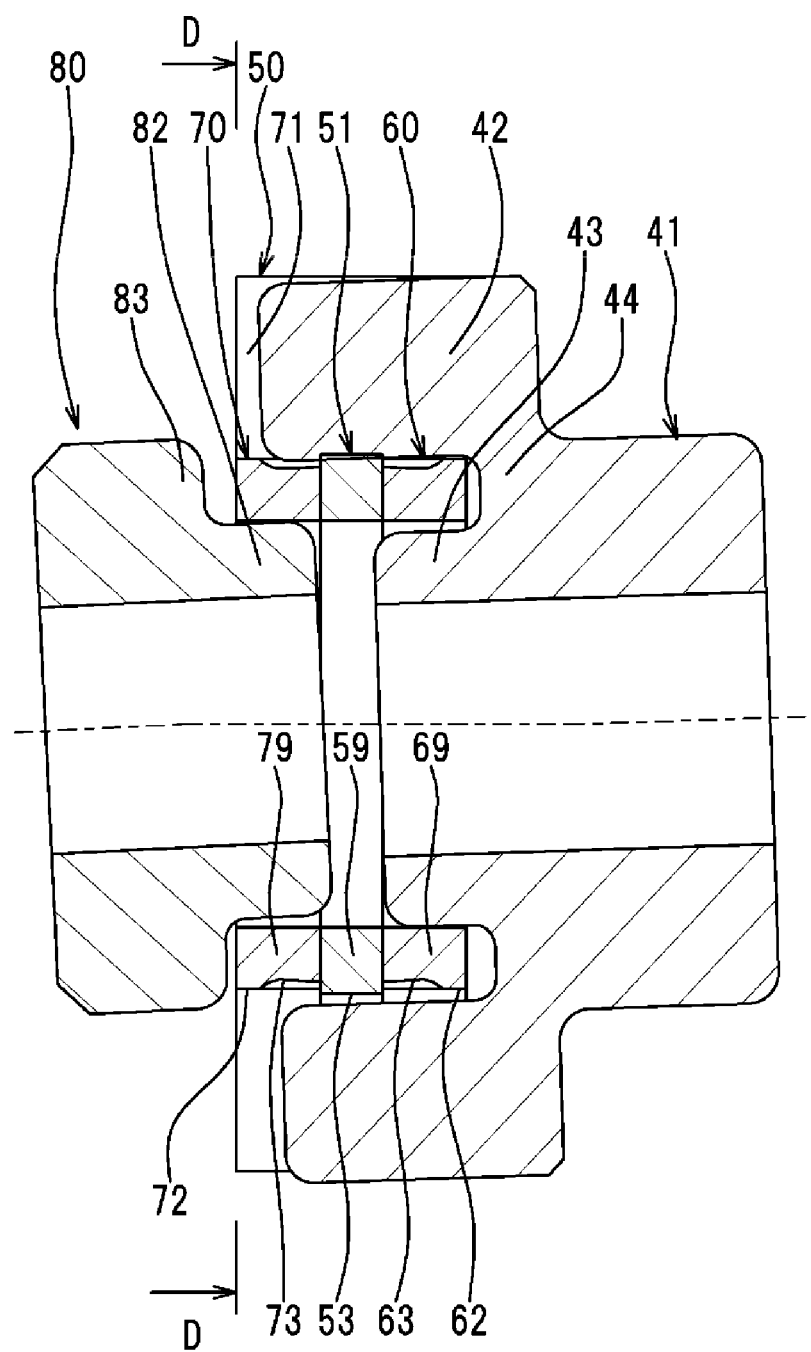
FIG. 9 is a state diagram of the shaft coupling according to the embodiment of the present invention in a state in which the first yoke and the second yoke are tilted from the state in FIG. 5.

When the first yoke 41 is tilted with respect to the intermediate member 50 as depicted in FIG. 9, in particular, the inner periphery of the distal end of the first pawl portion 42 is likely to interfere with the outer periphery of the second cover boss portion 79. Since the second thinned portions 73 are formed around the outer periphery of the second cover boss portion 79 in view of the case where the first yoke 41 tilts around the first boss portion 43, the inner periphery of the distal end of the first pawl portion 42 does not interfere with the outer periphery of the second cover boss portion 79. The inner periphery of the distal end of the first pawl portion 42 refers to an end of the first pawl portion 42 that is located on the worm 24 side in the axial direction and on the inner peripheral side in the radial direction. The second thinned portions 73 serve to eliminate the interference between the first pawl portions 42 and the second cover boss portion 79, and thus a stick-slip sound that may result from interference is prevented. The stick-slip sound in this case refers to a rubbing sound resulting from a stick-slip phenomenon that occurs when the first pawl portions 42 interfere with the second cover boss portion 79 and the second cover boss portion 79 moves rapidly in the axial direction while rubbing the first pawl portions 42.

Figure 7:
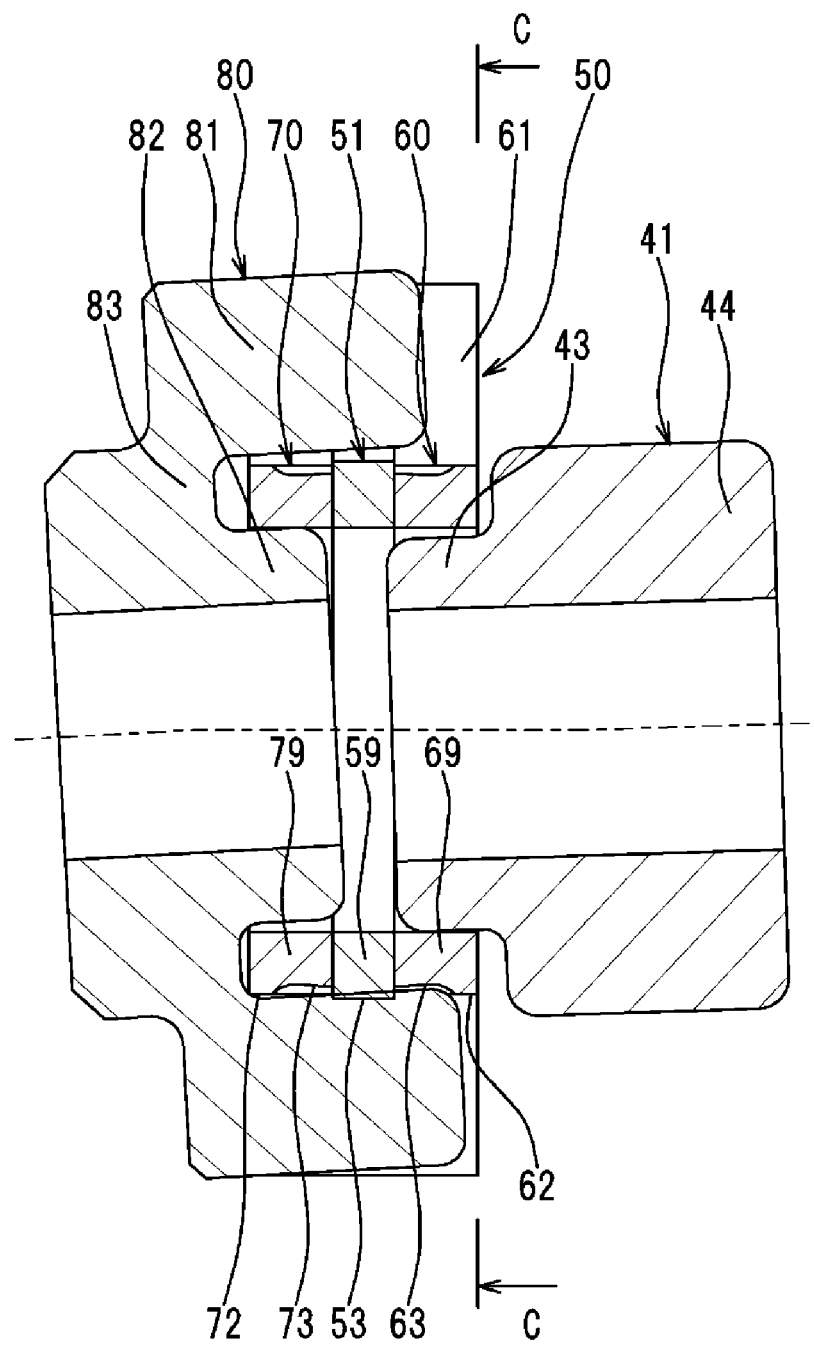
FIG. 7 is a state diagram of the shaft coupling according to the embodiment of the present invention in a state in which a first yoke and a second yoke are tilted from the state in FIG. 3.

When the second yoke 80 is tilted with respect to the intermediate member 50 as depicted in FIG. 7, in particular, the inner periphery of the distal end of the second pawl portion 81 is likely to interfere with the outer periphery of the first cover boss portion 69. Since the first thinned portions 63 are formed around the outer periphery of the first cover boss portion 69 in view of the case where the second yoke 80 tilts around the second boss portion 82, the inner periphery of the distal end of the second pawl portion 81 does not interfere with the outer periphery of the first cover boss portion 69. The inner periphery of the distal end of the second pawl portion 81 refers to an end of the second pawl portion 81 that is located on the electric motor 90 side in the axial direction and on the inner peripheral side in the radial direction. The first thinned portions 63 serve to eliminate the interference between the second pawl portions 81 and the first cover boss portion 69, and thus no stick-slip sound is generated. The stick-slip sound in this case refers to a rubbing sound resulting from a stick-slip phenomenon that occurs when the second pawl portions 81 interfere with the first cover boss portion 69 and the first cover boss portion 69 moves rapidly in the axial direction while rubbing the second pawl portions 81.

Figure 8:
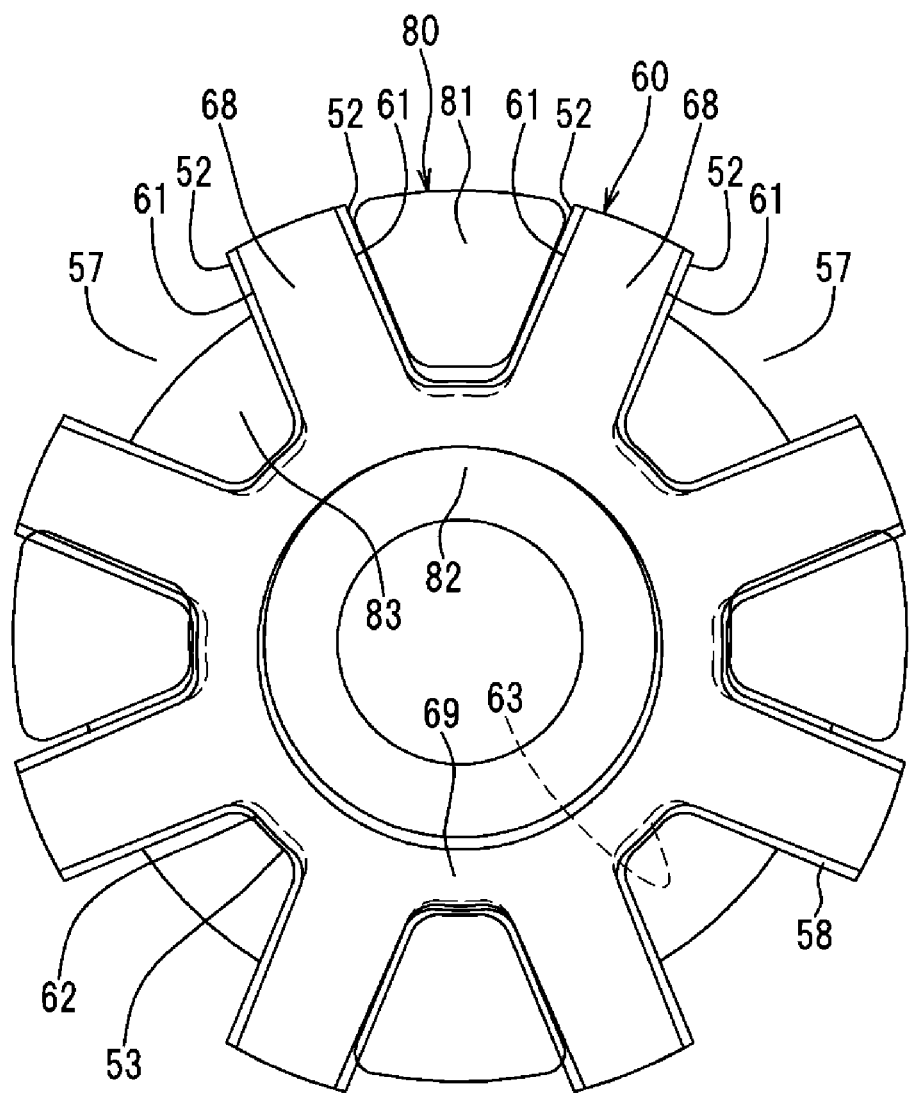
FIG. 8 is a cross-sectional view of the shaft coupling according to the embodiment of the present invention, taken along line C-C in FIG. 7.

In FIG. 8, the laterally opposite second pawl portions 81 appear to interfere with the first cover arm portions 68. However, since a chamfer shaped like a circular arc in cross section is formed on all sides of each second pawl portion 81, the interference is prevented. In particular, a chamfer shaped like a circular arc in cross section is formed on each of the opposite sides of the distal end of the second pawl portion 81, thus preventing the interference. The opposite sides of the distal end of the second pawl portion 81 refer to ends that are located on the electric motor 90 side in the axial direction and on the laterally opposite sides in the circumferential direction.

Figure 10:
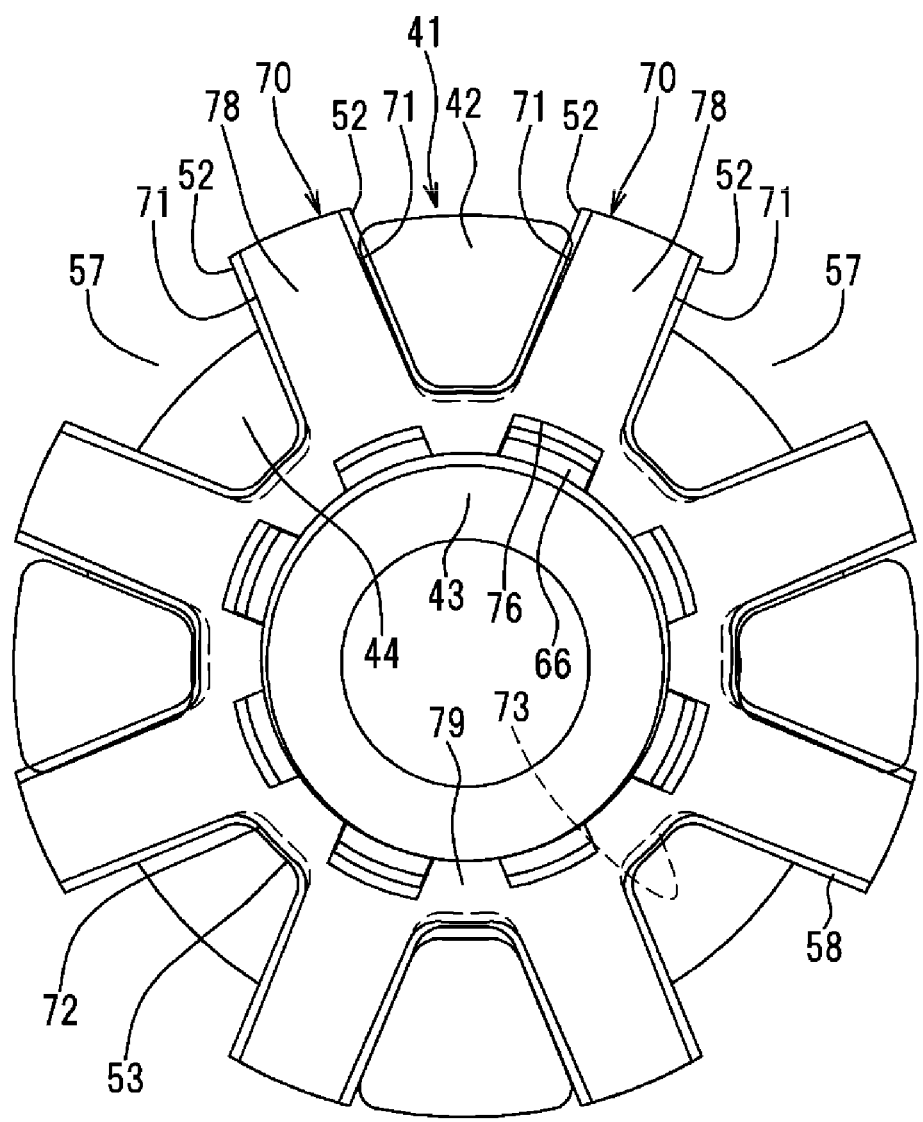
FIG. 10 is a cross-sectional view of the shaft coupling according to the embodiment of the present invention, taken along line D-D in FIG. 9.

In FIG. 10, the laterally opposite first pawl portions 42 appear to interfere with the second cover arm portions 78. However, since a chamfer shaped like a circular arc in cross section is formed on all sides of each first pawl portion 42, the interference is prevented. In particular, a chamfer shaped like a circular arc in cross section is formed on each of the opposite sides of the distal end of the first pawl portion 42, thus preventing the interference. The opposite sides of the distal end of the first pawl portion 42 refer to ends that are located on the worm 24 side in the axial direction and on the laterally opposite sides in the circumferential direction.

The present invention is not limited to the above-described embodiment. The present invention may of course be implemented in various forms without departing from the spirits of the present invention.

The above-described embodiment uses, as the worm 24, the worm and driving shaft integrated together. In another embodiment, the worm and the driving shaft may be separately formed, and the worm may be fixedly fitted to the driving shaft.

What is claimed is:

1. An electric power steering apparatus comprising:
   an electric motor that generates a rotation assist force in accordance with a steering operation of a driver;
   a shaft coupling that has a first end coupled to an output shaft of the electric motor; and
   a speed reduction mechanism coupled to a second end of the shaft coupling to reduce a rotation speed of the output shaft of the electric motor to transmit a reduced rotation speed to a steering mechanism; wherein
   the shaft coupling includes a first yoke having the first end;
   a second yoke having the second end; and
   an intermediate member provided between the first yoke and the second yoke, wherein
   the intermediate member includes a cylindrical intermediate boss portion, a plurality of arm portions extending radially from the intermediate boss portion, and an engagement space defined by a pair of the adjacent arm portions, wherein
   the intermediate member includes a center portion, a first cover portion disposed on an electric motor side with respect to the center portion, and a second cover portion disposed on a speed reduction mechanism side with respect to the center portion, wherein
   the center portion includes a center boss portion that configures a part of the intermediate boss portion, a center arm portion that configures a part of the arm portion, and a center engagement space that configures a part of the engagement space,
   the first cover portion includes a first cover boss portion that configures a part of the intermediate boss portion, a first cover arm portion that configures a part of the arm portion, and a first cover engagement space that configures a part of the engagement space,
   the second cover portion includes a second cover boss portion that configures a part of the intermediate boss portion, a second cover arm portion that configures a part of the arm portion, and a second cover engagement space that configures a part of the engagement space, and
   the center portion is configured to protrude toward an engagement space side with respect to the first cover portion and the second cover portion.

2. The electric power steering apparatus according to claim 1, wherein
   the first yoke includes a cylindrical first boss portion and a plurality of first pawl portions protruding toward the intermediate member with respect to the first boss portion, and
   the second yoke includes a cylindrical second boss portion and a plurality of second pawl portions protruding toward the intermediate member with respect to the second boss portion, wherein
   in an outer periphery of the first cover boss portion, a first thinned portion is formed which is recessed radially inward at a position corresponding to an inner periphery of a distal end of the second pawl portion, and in an outer periphery of the second cover boss portion, a second thinned portion is formed which is recessed radially inward at a position corresponding to an inner periphery of a distal end of the first pawl portion, and
   when an axis of the intermediate member is tilted with respect to an axis of the first yoke and an axis of the second yoke, the first thinned portion prevents interference with the second pawl portion and the first cover boss portion, and the second thinned portion prevents interference with the first pawl portion and the second cover boss portion.

3. The electric power steering apparatus according to claim 1, wherein
   the center portion is formed of a resin, and the first cover portion and the second cover portion are formed of a resin having a higher hardness than the resin of which the center portion is formed.

4. The electric power steering apparatus according to claim 2, wherein
   the first pawl portion has a trapezoidal shape as viewed in an axial direction, and
   the second pawl portion has a trapezoidal shape as viewed in the axial direction.

5. The electric power steering apparatus according to claim 1, wherein
   a circumferential side surface of the center arm portion is configured to protrude toward the engagement space side with respect to a circumferential side surface of the first cover arm portion and a circumferential side surface of the second cover arm portion.

6. The electric power steering apparatus according to claim 1, wherein
   an outer periphery of the center boss portion is configured to protrude toward the engagement space side with respect to an outer periphery of the first cover boss portion and an outer periphery of the second cover boss portion.

* * * * *